Aug. 30, 1932. J. C. CROWLEY 1,874,913
PRESSURE GAUGE
Filed Nov. 19, 1929
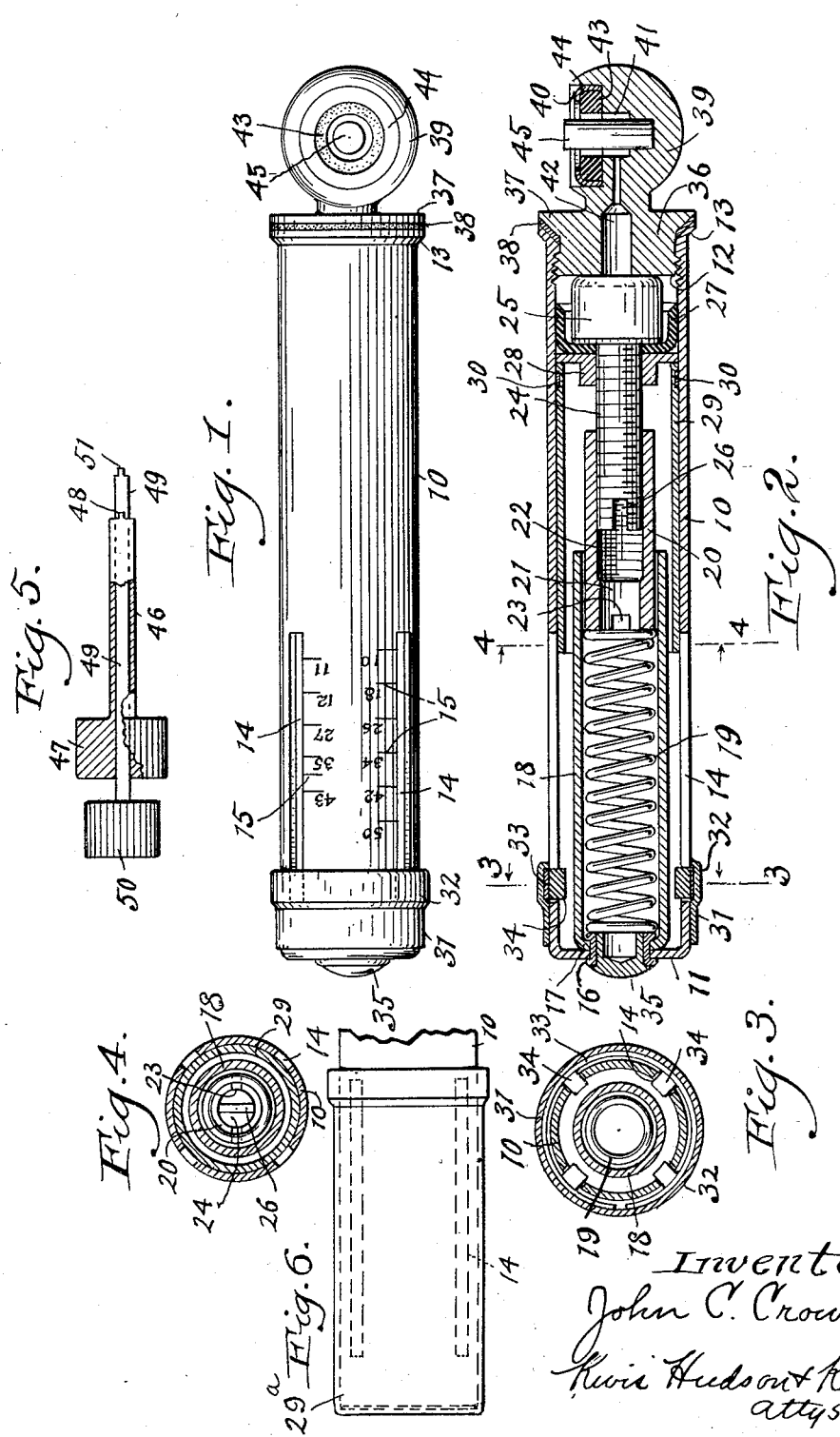
Inventor
John C. Crowley
Ruvis Hudson & Kent
attys.

Patented Aug. 30, 1932

1,874,913

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

PRESSURE GAUGE

Application filed November 19, 1929. Serial No. 408,256.

This invention relates to a fluid pressure gauge for measuring the pressure of fluid in a container, and more particularly to a gauge for measuring the pressure of air in a pneumatic tire.

An object of the invention is to provide a gauge of this character which may be readily and accurately adjusted to thereby assure that the gauge will correctly indicate the fluid pressure.

Another object is to provide in a pressure gauge of this type means for indicating the fluid pressure and for resetting the gauge for further use.

Another object is to provide a gauge of this character which is simple in construction, readily operated, and is formed of a relatively few number of parts of sturdy construction and therefore not easily subject to injury.

Additional objects and advantages will become apparent hereinafter as the detailed description of an embodiment of the invention proceeds.

In the accompanying drawing illustrating an embodiment of the invention,

Figure 1 is an elevational vew of the gauge.

Fig. 2 is a longitudinal sectional view thereof.

Figs. 3 and 4 are transverse sectional views taken approximately on lines 3—3 and 4—4 of Fig. 2, looking in the direction of the arrows.

Fig. 5 is a detail view partly in section and partly in elevation of a tool which may be advantageously used for adjusting the gauge; and Fig. 6 is a fragmentary elevational view of the gauge and shows a modified form of the means for resetting the gauge for further use.

The gauge casing is indicated at 10 and comprises an elongated metallic tube closed at one end by the portion 11 and open at the opposite end, the tube being interiorly threaded at 12 adjacent the open end which is flared outwardly as indicated at 13. The portion 11 at the closed end of the casing is provided with a centrally arranged opening, reference to which will later be made. Adjacent the closed end of the casing but inwardly therefrom the casing is provided with a plurality of longitudinally extending parallel slots 14 (four being shown in the drawing) while adjacent the slots are graduation numerals and marks 15 corresponding to the various fluid pressures to be indicated by the gauge. A ferrule 16 is arranged in the central opening in the portion 11 at the closed end of the casing, such ferrule being flanged at one end over the portion 11 and at the opposite end over an inwardly extending flange 17 formed on one end of a sleeve 18 arranged in the casing. The sleeve 18 is smaller in diameter than the inside diameter of the casing and is supported in the casing in spaced relation to the wall thereof by the cooperating engagement between the flange on the ferrule 16 and the flange 17 of the sleeve.

The purpose of the sleeve is to provide a housing for a coil spring 19 arranged therein and bearing at one end against the inner flange of the ferrule and at the opposite end against the end of a member 20. This member 20 extends into the sleeve 18 and is slidably received therein, such member having a central bore 21 threaded for a portion of its length as indicated at 22, while a transverse slot 23 is formed in the member at the end thereof which coacts with the spring 19. A threaded stem 24 is adjustably connected with the member 20 by means of the threads on the stem and the threads 22 in the bore 21 of the member, such stem being provided at one end with a cylindrical head portion 25 and at the other end with a transverse notch 26. A cup-shaped washer 27 is arranged on the stem adjacent the cylindrical head portion 25 so that the walls of the washer engage the inner wall of the casing and lie in spaced relationship with the cylindrical head 25. A metal washer may be positioned upon the stem so as to lie between the end of the head 25 and the base of the flexible washer 27, and the washer may be securely clamped in position between the head and a flanged nut 28 arranged on the stem 24.

A sleeve 29 is arranged in the casing with a sliding fit and surrounds the stem 24, the member 20, and a portion of the sleeve 18;

one end of the sleeve 29 bearing upon the flange of the nut 28 while its opposite end extends into that portion of the casing surrounding the sleeve 18 and provided with the slots 14. In order that the sleeve will be held in any position to which it is moved, as will be later described, the end thereof adjacent the flange of the nut 28 is provided exteriorly with a flexible band 30 so arranged as to have a tendency to expand radially into engagement with the wall of the casing.

A ring 31 is arranged on that part of the casing having the slots 14 so as to have sliding movement thereon, such ring being provided with an outwardly extending annular bead 32 receiving a band 33, the ring 31 and the band 33 however being capable of relative rotation. The band 33 is provided with a plurality of inwardly extending lugs 34 corresponding in number to the slots 14 in the casing, such lugs projecting inwardly of the casing through the slots. The opening in the portion 11 at the closed end of the casing is closed by means of a removable plug 35 while the opposite or open end of the casing is closed by a threaded plug member 36 provided with a flange portion 37, the under side of which is tapered to correspond with the flared end 13 of the casing whereby when the plug 36 is tightly screwed into the open end of the casing a flexible packing 38 will be securely clamped between the flared end 13 of the casing and the tapered side of the flange 37 of the plug 36. The plug 36 is further provided with an outwardly extending ball-shaped extension 39, one side of which is provided with a countersink 40 communicating with a reduced countersink 41 which in turn is in communication with a bore 42 arranged at right angles thereto and extending through the extension 39 and the plug 36 to the inner end of the plug. A flexible gasket 43 is held in the countersink 40 by means of a flanged ring 44 while a centrally arranged pin 45 is secured in the ball-shaped extension 39 and extends outwardly through the countersinks 40 and 41, there being a clearance between the pin and the countersink 41 and the periphery of a central opening in the flexible packing 43.

The following description of the operation of the gauge, together with the detailed structural description heretofore given, will clearly explain the device and the advantages present therein. The parts of the gauge are assembled in the casing in the relationship previously set forth, being maintained therein by the plug 36 when it is screwed into the open end of the casing. In order to accurately adjust the gauge so that it will give correct readings of the pressure it is necessary to regulate the tension of the spring 19. This may be expeditiously done by removing the plug 35 and using the tool shown in Fig. 5 of the drawing, although, of course, any other suitable tool could be used for the purpose. The tool shown comprises a tubular member 46 having a knurled head 47 at one end and provided at its opposite end with a pair of diametrically aligned outwardly extending lugs 48, while a stem 49 of greater length than the member 46 slidably and rotatably extends through a bore in the knurled head 47 and through the member. The stem is provided at one end with a knurled head 50 and at its opposite end with a diametrically extending, outwardly projecting lug 51. The tool is inserted into the casing 10 through the opening in the closed end, passing down through the convolutions of the spring 19 until the lugs 48 of the tubular member engage in the slot 23 in the member 20 and the lug 51 of the stem 49 engages in the notch 26 of the threaded stem 24. While the stem 49 is held against rotation by holding its head 50 to thereby hold the threaded stem 24 against rotation, the tubular member 46 is rotated to rotate the member 20 and thereby move the same axially with respect to the stem 24, thus increasing or diminishing the tension of the spring 19 until it is such that the gauge will accurately indicate the various pressures. This, of course, may be determined by tests with known fluid pressures. When the tension of the spring has been adjusted the opening in the closed end of the casing is closed by the plug 35 and the gauge is ready for use.

In using the gauge to determine the air pressure in pneumatic tires the ring 31 is slid inwardly on the casing until the lugs 34 of the band 33 arranged in the annular bead 32 of the ring engage the inner ends of the slots 14 in order to move the indicating member 29 to starting position. It is then moved outwardly towards the closed end of the casing and remains there during the operation of the gauge. The countersink 40 of the ball-head extension 39 is then pressed over the valve stem, the pin 45 engaging the valve pin and unseating the valve proper of the valve insides. The gauge is then in communication with the interior of the tire, the air being free to pass into the casing 10 through the space surrounding the pin 45 in the countersinks 40 and 41 and through the bore 42. This air acts on the piston formed by the head 25 of the threaded stem 24 and the flexible cup-shaped washer 27 to move the stem and member 20 inwardly against the tension of the spring 19. Since the sleeve 29 bears at one end on the flange of the nut 28 carried by the stem 24 it naturally follows that the sleeve is correspondingly moved inwardly of the casing. When the spring 19 has been compressed an amount such that the pressure of the air in the tire is insufficient to cause further movement of the piston, the gauge is removed and the amount of the air pressure is indicated by the graduation 15 with which the end of the sleeve 29 coincides, as viewed through the slots, the sleeve 29 being frictionally retained in such position. The gauge is then reset by moving the ring and sleeve to their first position, the ring being then returned to the closed end of the casing.

In Fig. 6 a slightly modified form of ring construction for returning the sleeve 29 to zero position is shown. In this form the ring is in the nature of an elongated cup-like sleeve 29a arranged on the end of the gauge and of a length such that when it is moved down to the zero end of the slots 14 the sleeve 29a will completely cover the slots while the bottom of the cup-like sleeve 29a will abut the end of the tubular casing 10. The sleeve 29a serves the same function as does the ring 31 and further functions as a cover for preventing dirt from entering the interior of the gauge and eliminates the necessity of providing the removable plug 35 for the opening in the end portion 11 of the casing.

Although preferred embodiments of the invention have been described and illustrated it should be understood that the invention is not to be limited thereto except in so far as the appended claims so limit it.

Having thus described my invention, I claim:

1. A fluid pressure gauge comprising a tubular casing adapted to be arranged in communication with a receptacle containing fluid under pressure and having an opening therein forming a window, a piston having a stem and movable in said casing by the fluid pressure, adjustable means secured to said stem, a spring in said casing bearing upon said means and opposing movement of said piston in one direction, and a sleeve slidable in said casing and visible through the opening therein and movable by said piston in said last mentioned direction, said sleeve and casing having cooperating means to indicate the amount of such movement of the piston.

2. A fluid pressure gauge comprising a tubular casing adapted to be arranged in communication with a receptacle containing fluid under pressure, a piston having a stem and movable in said casing by the fluid pressure, adjustable means secured to said stem, a spring in said casing bearing upon said means and opposing movement of said piston in one direction, a sleeve slidable in said casing and movable by said piston in said last mentioned direction, said casing having a longitudinal slot adjacent one end thereof and provided with graduation marks and numerals adjacent said slot with which the sleeve cooperates to indicate the amount of movement of the piston, and a member slidable upon said casing and having a lug extending through said slot adapted to engage said sleeve to move the latter to its starting position.

3. A fluid pressure gauge comprising a tubular casing adapted to be arranged in communication with a receptacle containing fluid under pressure and having an opening therein forming a window, a threaded stem in said casing and provided with means forming a piston adapted to be moved by the fluid pressure, an internally threaded member arranged on said stem, whereby relative rotation between said stem and member causes relative axial adjustment therebetween, a spring in said casing and bearing against an end of said member to resist movement of said piston in one direction, and a sleeve in said casing and movable by said piston and visible through the opening in said casing, said sleeve and casing having cooperating means to indicate the amount of movement of said piston.

4. A fluid pressure gauge comprising a tubular casing adapted to be arranged in communication with a receptacle containing fluid under pressure, a threaded stem in said casing and having means forming a piston adapted to be moved in one direction by the fluid pressure, an internally threaded member arranged on said stem, whereby relative rotation between said stem and member causes relative axial adjustment therebetween, a spring in said casing bearing upon said member and opposing movement thereof, a sleeve slidable in said casing and movable by the movement of said piston under the fluid pressure, said casing having means thereon cooperating with said sleeve to indicate the amount of such movement and the fluid pressure in said receptacle.

5. A fluid pressure gauge comprising a tubular casing adapted to be arranged in communication with a receptacle containing fluid under pressure, a threaded stem in said casing and provided with means forming a piston adapted to be moved in one direction by the fluid pressure, an internally threaded member arranged on said stem, whereby relative rotation between said stem and member causes relative axial adjustment therebetween, a spring in said casing in longitudinal alignment with and bearing upon said member and opposing movement thereof, a sleeve in said casing housing said spring and slidably receiving said internally threaded member and maintaining said member and spring in longitudinal alignment, a sleeve slidable in said casing and movable by the movement of said piston under the fluid pressure, said casing having a slot adjacent one end thereof, and a member slidable upon said casing and having a lug extending through said slot adapted to engage said sleeve to move the latter to its starting position.

6. A fluid pressure gauge comprising a tubular casing having an opening forming a window, a threaded stem provided with a piston arranged in said casing, an internally threaded sleeve member adjustably connected to said stem, a second sleeve in said casing and supported from an end of said casing in spaced relation to the wall thereof, said internally threaded sleeve being slidable in said second mentioned sleeve, a spring in said second mentioned sleeve and bearing upon the end of said threaded sleeve, visible through the opening in said casing, and a third sleeve slidably arranged in said casing and surrounding said first mentioned sleeve and bearing upon said piston, said casing and said sleeve having cooperating means to indicate the amount of movement of said piston.

In testimony whereof, I hereunto affix my signature.

JOHN C. CROWLEY.